United States Patent
Angelskaar et al.

(10) Patent No.: US 7,198,669 B2
(45) Date of Patent: Apr. 3, 2007

(54) ACCELERATOR ADMIXTURE

(75) Inventors: Terje Angelskaar, Bergdietikon (CH); Raita Iwata, Chigasaki (JP)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/516,699

(22) PCT Filed: May 22, 2003

(86) PCT No.: PCT/EP03/05456

§ 371 (c)(1),
(2), (4) Date: Jul. 29, 2005

(87) PCT Pub. No.: WO03/106375

PCT Pub. Date: Dec. 24, 2003

(65) Prior Publication Data

US 2006/0048685 A1    Mar. 9, 2006

(30) Foreign Application Priority Data

Jun. 17, 2002 (GB) ................... 0213765.1
Feb. 25, 2003 (GB) ................... 0304158.9

(51) Int. Cl.
  *C04B 40/00* (2006.01)
  *C04B 28/02* (2006.01)
  *C04B 22/12* (2006.01)
  *B05D 1/02* (2006.01)

(52) U.S. Cl. ................ 106/823; 106/727; 106/808; 106/819; 427/427; 427/427.1; 428/703

(58) Field of Classification Search ............ 106/727, 106/808, 819, 823; 427/427, 427.1; 428/703
See application file for complete search history.

(56) References Cited

U.S. PATENT DOCUMENTS

| | | | |
|---|---|---|---|
| 5,935,318 A | 8/1999 | Angelskaar et al. | |
| 6,302,954 B1 | 10/2001 | Lunkenheimer et al. | |
| 6,537,367 B2 | 3/2003 | Sommer | |
| 6,540,826 B2 | 4/2003 | Sommer | |
| 2002/0035952 A1 * | 3/2002 | Sommer et al. | 106/819 |

FOREIGN PATENT DOCUMENTS

| | | |
|---|---|---|
| EP | 0 657 398 A | 6/1995 |
| EP | 1 167 315 A | 1/2002 |
| EP | 1 167 317 A | 1/2002 |
| JP | 2000-185952 A2 | 7/2000 |
| JP | 2001-130935 A2 | 5/2001 |
| JP | 2002-047048 A2 | 2/2002 |
| JP | 2003-246659 A2 | 9/2003 |
| WO | WO 98 18740 A | 5/1998 |
| WO | WO 01 42165 A | 6/2001 |

OTHER PUBLICATIONS

Patent Abstracts of Japan, vol. 1999, No. 03, Mar. 31, 1999 and JP 10 330139 A (Chichibu Onoda Cement, Corp., Onoda Co.). Dec. 15, 1998.
Patent Abstracts of Japan, Vo. 1999, No. 04, Apr. 30, 1999 and JP 11 021158 A (Chichibu Onoda Cement Corp., Onoda Co., Ohbayashi Corp. Jan. 26, 1999.

* cited by examiner

*Primary Examiner*—Anthony J. Green
(74) *Attorney, Agent, or Firm*—Curatolo Sidoti Co. LPA

(57) ABSTRACT

An accelerator composition for use with sprayed cementitious compositions, which is an aqueous solution or dispersion of a blend of the essential Components 1–3
Component 1—aluminium sulphate
Component 2—at least one of an alkanolamine and an alkylene diamine or triamine
Component 3—hydrofluoric acid
optionally with at least one of Components 4–7, with the proviso that at least one of Component 4 or Component 5 be present:
Component 4—at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate and lithium sulphate;
Component 5—$C_1$–$C_{10}$ aliphatic mono- and dicarboxylic acids and their metal salts;
Component 6—aluminium hydroxide;
Component 7—at least one of phosphoric acid and phosphorous acid.

The accelerators have excellent long-term stability and work well with "difficult" cements, such as some Japanese OPCs.

20 Claims, No Drawings

ACCELERATOR ADMIXTURE

CROSS REFERENCE TO RELATED APPLICATIONS

This application is a national stage application of International Application No. PCT/EP03/05456, filed May 22, 2003, which claims the benefit of Great Britain Application Nos. GB 0213765.1, filed Jun. 17, 2002 and GB 0304158.9 filed Feb. 25, 2003, from which application priority is claimed.

This invention relates to low alkali and alkali-free accelerators for sprayed cementitious compositions.

The use in cementitious compositions such as concrete to be applied by spraying of low alkali and alkali-free accelerators in place of the traditional aluminates and other strongly alkaline materials is now well established. The major components of such accelerators are aluminium compounds, the most commonly encountered being aluminium sulphate and amorphous aluminium hydroxide. In addition to these aluminium compounds, a variety of other components have been used in such accelerators, these including alkanolamines, other aluminium salts (such as oxalates and nitrates) and various organic acids. More recent compositions have involved the use of fluoride ions.

The major problem in the art is to find an accelerator composition that combines acceptable performance, acceptable stability and an acceptable compressive strength. Stability can be a problem, especially in the more extreme conditions sometimes encountered in tunnels, and a reasonable shelf-life is necessary for a practical accelerator. All accelerators used in spraying concrete lower the compressive strength compared to the compressive strength of the same concrete without accelerator. It is necessary that this lowering be kept to a minimum. In addition, a good early strength development in the 1–4 hour period after spraying is particularly desired.

In addition, the worldwide variation in cement types causes problems. What works well with one cement in, say, Europe will not necessarily work so well with an Australian or a Japanese cement. It is difficult to formulate an accelerator that will work acceptably well with all types.

It has now been found that a particular combination of materials gives an accelerator that performs especially well and is very stable. The invention therefore provides an accelerator composition adapted to be used with sprayed cementitious compositions, which is an aqueous solution or dispersion of a blend of the essential Components 1–3:

Component 1—aluminium sulphate
Component 2—at least one of an alkanolamine and an alkylene diamine or triamine
Component 3—hydrofluoric acid optionally with at least one of Components 4–7, with the proviso that at least one of Component 4 or Component 5 be present;

Component 4—at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate and lithium sulphate;
Component 5—$C_1$–$C_{10}$ aliphatic mono- and dicarboxylic acids and their metal salts;
Component 6—aluminium hydroxide;
Component 7—at least one of phosphoric acid and phosphorous acid the ingredients being present in the following proportions (active ingredients by weight);

Component 1—from 30 to 60%, calculated on the basis of 17% aluminium sulphate;
Component 2—from 0.1 to 15%
Component 3—from 0.2 to 8.0%
Component 4—up to 15%
Component 5—up to 15%
Component 6—up to 15%
Component 7—up to 5%.

Component 1, aluminium sulphate, may be any aluminium sulphate used in the manufacture of accelerators. It may be fully hydrated, or totally or partially calcined. A typical grade, and the one on which the proportion is based, is "7%" aluminium sulphate ($Al_2(SO_4)_3 \cdot 14.3H_2O$) (called thus because that is the proportion of aluminium oxide therein) should any other aluminium sulphate be required, he appropriate quantity can be easily calculated on this basis. Preferably Component 1 is present in the proportion of from 30–46% by weight of the total accelerator composition.

Component 2, alkanolamine, alkylene diamine and alkylene triamine may be any such material, but is preferably ethylene diamine, ethylene triamine, diethanolamine or triethanolamine, most preferably diethanolamine. It is preferably present in the proportion of from 0.1–10%, more preferably from 0.1–8%, by weight of the total accelerator composition. It is possible to use a combination of two or more of such materials.

Component 3, hydrofluoric acid is generally used as an aqueous solution of about 40% HF by weight. The proportion of hydrofluoric acid present in the total accelerator composition (as HF) is preferably from 2–6%, more preferably from 2–4%, by weight of the total accelerator.

Component 4 may be selected from among the materials previously named. Although sodium and potassium are alkali metals, the proportion of such metals in the accelerator compositions according to this invention may be sufficiently low to permit these accelerators to be considered as alkali-free according to the accepted European definition (lower than 1% (weight) of $Na_2O$ equivalent). Up to 8.5% $Na_2O$ equivalent is considered "low alkali" and is acceptable for many purposes—in many cases, rigorous exclusion of alkali on health and environmental grounds is not necessary and a small proportion of at least one alkali metal enhances the early strength development. Thus, for the purposes of this invention, and contrary to the current practices of the art with respect to alkali-free accelerators, it is preferred that a minor proportion of alkali metal be present. This proportion is preferably no higher than 5% $Na_2O$ equivalent. The preferred proportion of Component 4 is from 1–10% by weight of the total accelerator composition. Component 4 is typically added to the accelerator composition as a 30% weight solution in water.

Component 5 may be selected from one or more of the group of acids. Especially preferred are formic, oxalic and glycolic acids and their metal salts, but other acids, such as acetic, propionic, succinic, citric and tartaric acids are also useful. Preferred proportions of Component 5 are from 2–10%, more preferably from 4–8%, by weight of the total accelerator composition.

It is required that at least one of Component 4 and Component 5 be present in the composition. The preferred Components 4 and/or 5 for the purposes of this invention are sodium oxalate, potassium oxalate and mixtures of one or both of these with lithium hydroxide. The LiOH/sodium-potassium oxalate mixtures are particularly preferred.

Component 6, aluminium hydroxide, is preferably amorphous aluminium hydroxide of the type normally used in accelerators for sprayed concrete. It is preferably present in the proportion of up to 10% by weight of the total accelerator composition. It is possible to use crystalline aluminium hydroxide; this is considerably cheaper, but it is difficult to dissolve and it does not perform as well as the amorphous material.

Component 7, phosphoric acid ($H_3PO_4$) or phosphorous acid ($H_3PO_3$), acts as a stabiliser. Although it is possible to omit it, it confers a useful degree of stability on the accelerator compositions of this invention, a vital consideration in tunnelling operations where the accelerator may have to remain in a ready-to-use state for long periods. It is therefore preferably present, and in a concentration of from 0.1–2% by weight of the accelerator composition. It is possible to use a blend of both acids, but it is preferred to use phosphoric acid alone.

The accelerator compositions may be prepared by simply mixing the abovementioned components in any order and stirring to give an aqueous solution. In some cases, additional water will need to be added. The final composition will generally comprise from 40–70% by weight of water.

Given the nature of the ingredients, the resulting accelerator composition will not be a simple mixture of ingredients but a complex blend of reaction products. For example, the HF will react with some other components (most especially aluminium hydroxide, if any be present). This composition is very stable, having a shelf life under normal storage conditions of several months.

In use, the accelerator composition of the invention is injected at a spray nozzle in the conventional manner. The dose is typically from 5–12% by weight accelerator composition based on cement weight. The invention also provides a method of applying a cementitious composition to a substrate by spraying, comprising the steps of mixing a batch of fluid cementitious composition and conveying it to a spray nozzle, there being injected at the nozzle an accelerator as hereinabove described.

Sprayed cementitious compositions that utilise accelerator compositions according to this invention exhibit an unusually rapid build-up of compressive strength. In addition, the accelerator compositions work well with an unusually wide variety of cements, including Japanese cements, with which other alkali-free accelerators give less satisfactory results. The invention also provides a hardened cementitious layer applied to a substrate by spraying through a spray nozzle, there having been added at the nozzle an accelerator as hereinabove described.

The invention is further illustrated by the following non-limiting examples in which all parts are by weight.

A number of accelerators are added to a test mortar mix having the following constitution:

| | |
|---|---|
| water | 198 parts |
| ordinary Portland cement | 450 parts |
| sand (DIN 196-1) | 1350 parts |
| superplasticiser | 2.7 parts |

The cement is Tayheiyo OPC, a commonly-used Japanese cement. The superplasticiser used is NT-1000 ex NMB Ltd., Japan.

EXAMPLE 1

To the abovementioned mix is added with thorough mixing 31.5 parts of an accelerator according to the invention and having the following composition (given as percentages by weight):

| | |
|---|---|
| aluminium sulphate (16$H_2O$) | 35 |
| diethanolamine | 2.1 |
| sodium sulphate | 11.2 |
| oxalic acid | 7.5 |
| hydrofluoric acid | 6 |
| amorphous aluminium hydroxide | 9.5 |
| water | to 100% |

EXAMPLE 2

Example 1 is repeated, with the exception that the 31.5 parts of the accelerator according to the invention is replaced by a commercially-available alkali-free accelerator sold as MEYCO® SA162.

EXAMPLE 3

Example 1 is repeated, with the exception that the 31.5 parts of the accelerator according to the invention is replaced by a commercially-available alkali-free accelerator sold as MEYCO® SA 170.

The samples are tested for compressive strength according to prEN (preliminary European Standard) 12394 and the results obtained are shown below:

| | Compressive strength (MPa) at | | |
|---|---|---|---|
| Example No. | 6 h | 1 d | 7 d |
| 1 | 3.6 | 20.1 | 39 |
| 2 | 1.4 | 1.8 | 23.2 |
| 3 | 0.8 | 8.6 | 28.9 |

It can be seen that the composition comprising the accelerator according to the invention develops compressive strength earlier than the compositions comprising the commercial accelerators, and that the final strength is substantially higher.

The invention claimed is:

1. An accelerator composition for use with sprayed cementitious compositions, which comprises an aqueous solution or dispersion of a blend of:
   about 30 to about 60% aluminium sulphate, calculated on the basis of $Al_2(SO_4)_3 \cdot 14.3H_2O$,
   about 0.1 to about 15% of at least one of an alkanolamine, an alkylene diamine or alkylene triamine,
   about 0.2 to about 8% hydrofluoric acid,
   (a) up to about 15% of at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate, or lithium sulphate; and
   (b) greater than 0% up to about 15% of at least one of $C_1$–$C_{10}$ aliphatic monocarboxylic acids, a metal salt of $C_1$–$C_{10}$ aliphatic monocarboxylic acids, $C_1$–$C_{10}$ aliphatic dicarboxylic acids or a metal salt of $C_1$–$C_{10}$ aliphatic dicarboxylic acids;

having an alkali metal equivalent greater than 1% $Na_2O$ equivalent.

2. The accelerator of claim 1, in which at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate, or lithium sulphate is present and contains alkali metal in the range of from greater than 1 to about 8.5% $Na_2O$ equivalent.

3. The accelerator of claim 2, in which the alkali metal equivalent is from greater than 1 up to about 5% $Na_2O$ equivalent.

4. The accelerator of claim 1 further comprising up to about 15% aluminium hydroxide.

5. The accelerator of claim 1 further comprising up to about 15% of at least one of phosphoric acid or phosphorous acid.

6. The accelerator of claim 4 further comprising up to about 15% of at least one of phosphoric acid or phosphorous acid.

7. The accelerator of claim 1, wherein component (b) is at least one of formic acid, oxalic acid, glycolic acid, acetic acid, propionic acid, succinic acid, citric acid, tartaric acid or their corresponding metal salts.

8. The accelerator of claim 1, wherein component (b) is present from about 2–10% by weight.

9. A method of applying a cementitious composition to a substrate by spraying, comprising the steps of mixing a batch of fluid cementitious composition and conveying it to a spray nozzle, there being injected at the nozzle the accelerator of claim 1.

10. The method of claim 9 wherein the accelerator further comprises up to about 15% aluminium hydroxide.

11. The method of claim 9 wherein the accelerator further comprises up to about 15% of at least one of phosphoric acid or phosphorous acid.

12. The method of claim 10 wherein the accelerator further comprises up to about 15% of at least one of phosphoric acid or phosphorous acid.

13. The method of claim 9, in which at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate, or lithium sulphate is present and contains alkali metal in the range of from greater than 1 to about 8.5% Na2O equivalent.

14. The method of claim 13, in which the alkali metal equivalent is from greater than 1 up to about 5% $Na_2O$ equivalent.

15. A hardened cementitious layer applied to a substrate by spraying through a spray nozzle, there having been added at the nozzle the accelerator of claim 1.

16. The hardened cementitious layer of claim 15 wherein the accelerator further comprises up to about 15% aluminium hydroxide.

17. The hardened cementitious layer of claim 15 wherein the accelerator further comprises up to about 15% of at least one of phosphoric acid or phosphorous acid.

18. The hardened cementitious layer of claim 16 wherein the accelerator further comprises up to about 15% of at least one of phosphoric acid or phosphorous acid.

19. The hardened cementitious layer of claim 15, in which at least one of sodium hydroxide, potassium hydroxide, lithium hydroxide, magnesium hydroxide, lithium carbonate, sodium carbonate, potassium carbonate, magnesium carbonate, sodium sulphate, potassium sulphate, magnesium sulphate, or lithium sulphate is present and contains alkali metal in the range of from greater than 1 to about 8.5% $Na_2O$ equivalent.

20. The hardened cementitious layer of claim 19, in which the alkali metal equivalent is from greater than 1 up to about 5% $Na_2O$ equivalent.

* * * * *